Feb. 16, 1954 — M. J. CAVANAUGH — 2,669,053
EXPANDING FISHHOOK
Filed July 13, 1948 — 2 Sheets-Sheet 1
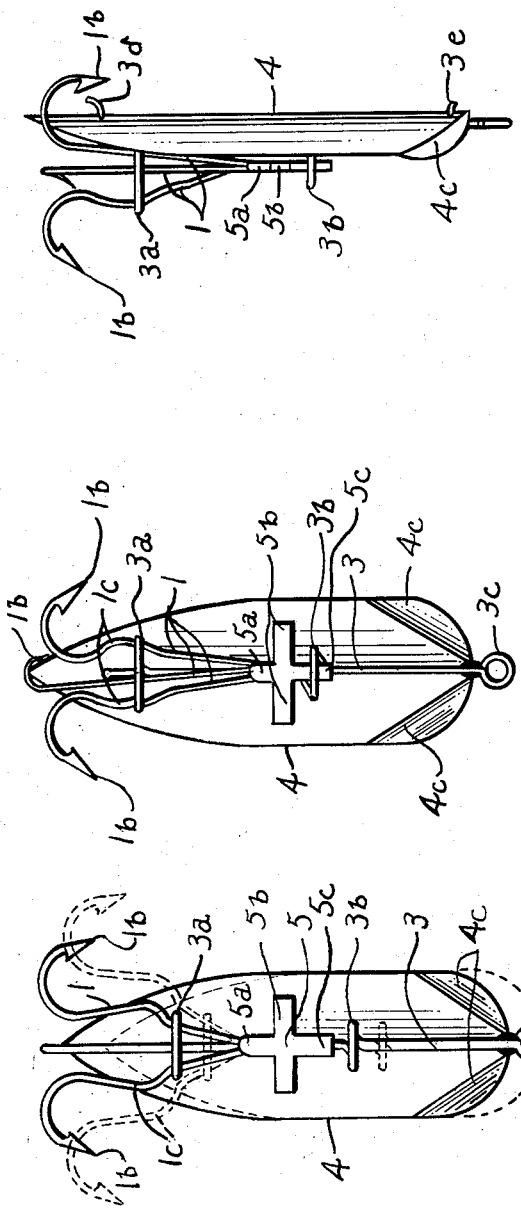
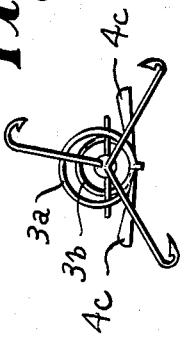

Feb. 16, 1954    M. J. CAVANAUGH    2,669,053
EXPANDING FISHHOOK
Filed July 13, 1948    2 Sheets-Sheet 2
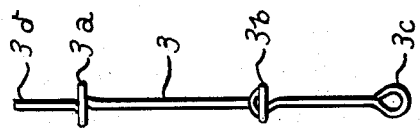
Fig. 6
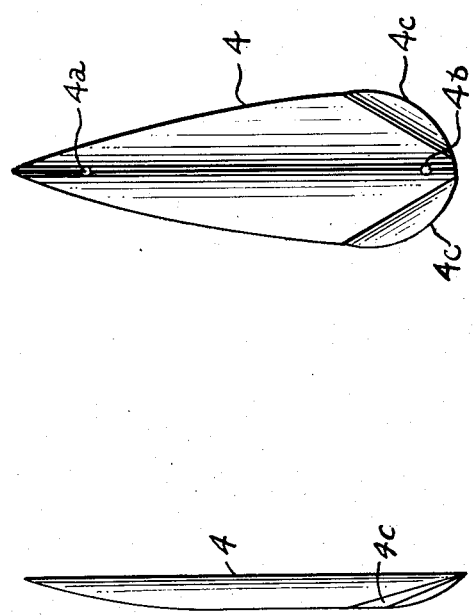
Fig. 8
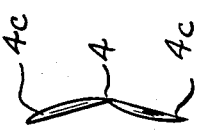
Fig. 10
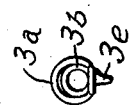
Fig. 7
Fig. 9
INVENTOR.
Martin J. Cavanaugh
BY Alexander Dowell
ATTORNEYS Patented Feb. 16, 1954

2,669,053

UNITED STATES PATENT OFFICE 2,669,053

EXPANDING FISHHOOK

Martin John Cavanaugh, Elmira, N. Y.

Application July 13, 1948, Serial No. 38,382

1 Claim. (Cl. 43—36)

My invention relates to improvements in expanding fish hooks, and more specifically to the type of fishing lure wherein a plurality of bunched hooks expand laterally outward from the lure when a longitudinal pull is exerted on the hooks, as by a fish nibbling thereon.

The primary object of my invention is to provide a lure for catching fish which will expand in the fish's mouth to prevent it from throwing or spitting out the lure.

Another important object of my invention is the provision of an expanding hook fishing lure wherein the lateral expanding force is exerted by the springiness of the wire of which the hooks are made.

Still another object of the invention is to provide an expanding hook fishing lure wherein the weight of the hook assembly is reduced to a minimum so that the longitudinal force exerted during casting will be insufficient to prematurely trip the expanding function of the lure.

A further object of my invention is the provision of an expanding hook fishing lure of sufficiently rugged construction to withstand snagging and other anticipatable strains.

Other objects of my invention will become apparent during the discussion of the accompanying drawings wherein:

Fig. 1 is a front elevation view of the lure assembly with the hooks expanded.

Fig. 2 is a front elevation view of this assembly with the hooks retracted.

Fig. 3 is a side elevation view of the lure.

Fig. 4 is an end view of the leading end of the lure of Fig 1.

Fig. 5 is an end view of the trailing end of the lure of Fig. 3.

Fig. 6 shows the buncher separated from the hooks.

Fig. 7 shows an end view of the buncher.

Fig. 8 is a front elevation view of the spoon portion of the lure.

Fig. 9 is a side elevation view of the spoon.

Fig. 10 is an end view of the spoon.

Referring to the drawing, the hook assembly comprises a multiple hook member 1 having barbs 1b at the trailing end of each hook 1. In the shank of each of the hooks 1 is a raised cam portion 1c.

The buncher 3, Figs. 6 and 7, comprises a length of wire bent to form rings 3a and 3b. At the forward end thereof is a loop 3c for securing the lure to the fishing line, and at each end of the buncher 3 are crooked portions 3d and 3e, respectively (see Fig. 3), designed to secure the buncher to the spoon 4.

Figs. 1 and 2 show the hooks respectively expanded and retracted, the expansion and retraction being functions of the relative longitudinal position of the hook with respect to the buncher. As the hook member 1 is moved forward with respect to the buncher 3, the ring 3a bunches the shanks of the hook 1, and in the forwardmost position of the hooks, the ring 3a presses the hooks together against the raised cam 1c on the hook shanks.

Figs. 8, 9 and 10 show the shape of the spoon 4, including holes 4a and 4b adapted to receive crooked ends 3d and 3e, respectively, of buncher 3. The bent up leading edges 4c of the spoon 4 tend to make it wobble as it goes through the water.

Figs. 1 through 5 show a method of joining three hook shanks 1 together at their leading ends. A cross-shaped member 5 is employed to secure the hook shanks 1 together with their barbed ends normally flared, said hook shanks 1 being secured by crimping in the end 5a of member 5, with the crossed portion 5b serving as a stop to prevent the hook assembly from passing through either the rings 3a or 3b. When the hooks are retracted as shown in Fig. 2, leg 5c of member 5 extends through ring 3b to maintain the hook assembly in alignment with the spoon.

In operation, the hooks are retracted as shown in Figs. 2 and 3 until a fish grabs the lure. The longitudinal pull on the hooks by the fish causes them to pull outward from the lure and thus allows them to expand as shown in Fig. 1, thus making it impossible for the fish to spit them out. When the fish is removed from the hooks, they are reset again to their retracted position before being cast back into the water.

I do not limit my invention to the exact form shown in the drawings, for obviously changes may be made within the scope of the claim.

I claim:

An expanding-hook fishing lure, comprising a spoon-shaped body; a hook assembly including a plurality of fish hooks of resilient wire normally flaring outwardly from the axis of the assembly and having barbed ends, said assembly being mounted on the body for limited longitudinal movement with respect thereto; means on said body for contracting the barbed ends of said hooks together when the assembly is pulled in the forward direction with respect to said body; means for attaching said lure to a fishing line, said hooks in the assembly being joined together at the leading ends of ther shanks so that the shanks will flare outwardly with the barbs disposed at the trailing ends of the shanks and extending outwardly therefrom; an outwardly extending cam portion on each shank near the barbed end thereof, said cams underlying said contracting means when said assembly is pulled in the forward direction, thereby laterally bunching the hooks in said forward position, and a cross member connecting the shanks at their leading ends, said contracting means comprising a member secured to said body and extending longitudinally thereof; a pair of spaced parallel eyes on said member; the hook assembly extending through the rear eye so that the leading end thereof can travel between the two eyes, its travel being limited by said cross member, and the barbed ends of the hooks being contracted by the rear eye pressing said cam portions of the shank together when the leading end of the hook assembly is pulled into the forward eye.

MARTIN JOHN CAVANAUGH.

References Cited in the file of this patent

UNITED STATES PATENTS

| Number | Name | Date |
| --- | --- | --- |
| 129,053 | Pitcher | July 16, 1872 |
| 450,317 | Munn | Apr. 14, 1891 |
| 1,197,820 | Guise | Sept. 12, 1916 |
| 1,430,336 | Stolley | Sept. 26, 1922 |
| 1,866,623 | Crow | July 12, 1932 |

FOREIGN PATENTS

| Number | Country | Date |
| --- | --- | --- |
| 8,965 | Great Britain | 1886 |
| 111,657 | Great Britain | Oct. 15, 1917 |
| 236,188 | Switzerland | June 16, 1945 |